(12) United States Patent      (10) Patent No.: US 9,235,451 B2
Tian      (45) Date of Patent: Jan. 12, 2016

(54) BROWSER KERNEL SWITCHING METHOD

(75) Inventor: Liang Tian, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 123 days.

(21) Appl. No.: 13/885,575

(22) PCT Filed: Nov. 16, 2011

(86) PCT No.: PCT/CN2011/082274
§ 371 (c)(1),
(2), (4) Date: Jul. 10, 2013

(87) PCT Pub. No.: WO2012/065548
PCT Pub. Date: May 24, 2012

(65) Prior Publication Data
US 2014/0149995 A1      May 29, 2014

(30) Foreign Application Priority Data
Nov. 19, 2010    (CN) .......................... 2010 1 0552555

(51) Int. Cl.
*G06F 13/00*      (2006.01)
*G06F 17/00*      (2006.01)
*G06F 9/54*      (2006.01)
*G06F 17/30*      (2006.01)
*G06F 9/46*      (2006.01)

(52) U.S. Cl.
CPC ............ *G06F 9/54* (2013.01); *G06F 17/30899* (2013.01); *G06F 9/46* (2013.01)

(58) Field of Classification Search
None
See application file for complete search history.

(56) References Cited

U.S. PATENT DOCUMENTS

| | | | | |
|---|---|---|---|---|
| 5,872,572 A | * | 2/1999 | Rossignac | 345/428 |
| 8,131,258 B2 | * | 3/2012 | Smith et al. | 455/407 |
| 8,291,078 B2 | * | 10/2012 | Fisher et al. | 709/226 |
| 8,543,668 B1 | * | 9/2013 | Long | 709/219 |
| 8,756,488 B2 | * | 6/2014 | Meredith et al. | 715/205 |
| 8,838,726 B2 | * | 9/2014 | Srinivas | G06F 9/544 |
| | | | | 709/203 |
| 2005/0015406 A1 | * | 1/2005 | Sambhus et al. | 707/200 |
| 2009/0219284 A1 | * | 9/2009 | Maillot et al. | 345/420 |
| 2011/0157219 A1 | * | 6/2011 | Chakra et al. | 345/619 |
| 2012/0192063 A1 | * | 7/2012 | Koren et al. | 715/252 |

FOREIGN PATENT DOCUMENTS

| | | |
|---|---|---|
| CN | 101504650 A | 8/2009 |
| CN | 101655863 A | 2/2010 |
| WO | WO2010/121530 A1 * | 10/2010 |

OTHER PUBLICATIONS

English translation of WO/2010/121530, 18 pages.*
International Search Report to PCT/CN2011/082274.

* cited by examiner

*Primary Examiner* — H S Sough
*Assistant Examiner* — Phuong Hoang
(74) *Attorney, Agent, or Firm* — Troutman Sanders LLP

(57) ABSTRACT

The present invention provides a browser kernel switching method, which enables a browser to switch between different browser kernels when browsering different web pages, and comprises the following steps: detecting, by the browser, whether a kernel switch is needed; and transferring a post data in a previous kernel of the browser to the kernel which is to be switched when loading a page that requires to switch kernel.

7 Claims, 2 Drawing Sheets

BROWSER KERNEL SWITCHING METHOD

This application claims priority to PCT/CN2011/082274 filed Nov. 16, 2011 and to Chinese Appl.No. 201010552555.9 filed Nov. 19, 2010.

FIELD OF THE INVENTION

The present invention relates to the field of browser application, in particular to a browser kernel switching method.

BACKGROUND OF THE INVENTION

As a web site browsing tool, a browser has a very large user group, and almost every computer connecting to the Internet needs to use a browser to browser web pages.

The IE browser of Microsoft has the largest share of the market due to user's usage habit for IE browser and its binding with operating systems. All enterprises that study IE browser and try to make a difference in the field of web browsers, without an exception, make use of the Trident™ kernel of IE at first. But the IE kernel has its "inborn weakness" in terms of design, so there are many problems with IE that have not been solved, including browser hang, browser crash, long loading time, etc.

Under such a circumstance, an open source browser kernel Webtik emerged, which is adopted by many other browsers including Google. Nevertheless, comparing to IE browser's several years of compatibility tests, Webtik has some problems concerning compatibility despite it has advantages in speed and stability.

Therefore, many browsers use "dual-kernel" to speed up web page access. The so-called "dual-kernel" actually means to be based on both the WebKit® kernel and the Trident™ kernel at the same time, so that a browser can have the both high speed of WebKit® and the good compatibility of Trident™.

Conventional "dual-kernel" browsers usually use a compatibility mode list to enable the browsers to distinguish which kernel is needed for the page that is currently accessing. The compatibility mode list or fast speed mode list is usually very large and hard to maintain; and if the web site to be browsed includes a redirection to a page that only supports the Trident™ kernel, exceptions will occur, so this kind of browser, when confronted with such a problem, will directly use the Trident™ kernel to access the web site that might redirect to a page supporting only the Trident™ kernel. In this case, exceptions are avoided, but the speed of accessing the web page is slowed greatly, which affects usage by users.

SUMMARY OF THE INVENTION

In view of this, in order to solve the above-mentioned problem, the present invention provides a browser kernel switching method.

To achieve said object, the present invention provides a browser kernel switching method, which enables a browser to use different browser kernels for different web pages. Said method specifically comprises the following steps: determining, by a browser, whether a loading of current web page requires to switch kernel of the browser; transferring a post data in a first kernel of the browser to a second kernel of the browser which is to be switched for use in the browser when the browser is loading a web page that requires to switch the kernel of the browser; returning the post data, by the second kernel of the browser, to a web page server.

Preferably, the step of transferring the post data further comprises: obtaining the post data in the first kernel by the browser through an interface of the browser kernel.

Preferably, when the browser redirects to a payment web site and loads the web page thereof, the kernel of the browser requires to be switched.

Preferably, the browser exchanges data with a browser management server over the Internet, and said method further comprises: obtaining, by said browser management server, operations that require kernel switch during the user's use of the browser and generating a kernel switching list; searching said kernel switching list when the browser performs the step of determining whether the loading of current web page requires to switch kernel of the browser, and determining whether it is necessary to switch the kernel according to a result of the searching.

Preferably, the method of generating a kernel switching list comprises: when user's redirecting to a web page by the first kernel fails and redirecting to the web page by the second kernel succeeds, recording this operation by the browser and uploading said operation to the browser management server; recording this redirecting operation by the browser management server and making the browser to perform a kernel switching operation when the same redirecting operation is performed by any user again.

The present invention also provides a browser kernel switching apparatus, which enables a browser to use different browser kernels for different web pages. Said apparatus comprises: a module adapted to determining by the browser whether a loading of the current page requires to switch kernel of the browser; a module adapted to transferring a post data in a first kernel of the browser to a second kernel of the browser which is to be switched for use in the browser when the browser is loading a page that requires to switch the kernel of the browser; and a module adapted to returning the post data from the second kernel to a web page server.

Preferably, said apparatus further comprises: a module adapted to exchanging data with a browser management server over the Internet; the browser management server obtains operations that require kernel switch during the user's use of the browser and generates a kernel switching list; said module adapted to determining by a browser whether a loading of the current web page requires to switch kernel of the browser searches the kernel switching list when performing the determination, and determines whether it is necessary to switch the kernel according to a result of the searching.

Preferably, said apparatus further comprises: a module adapted to, when user's redirecting to a web page by the first kernel fails and redirecting to the web page by the second kernel succeeds, recording this redirecting operation and uploading said redirecting operation to the browser management server; the browser management server records this redirecting operation into the kernel switching list and makes the browser to perform a kernel switching operation when the same redirecting operation is performed by any user again.

The present invention also provides a computer readable recording medium having program for executing said browser kernel switching method recorded thereon.

The embodiments of the present invention submit data of the first kernel to the second kernel for processing by means of form transferring, thereby realizing dual-kernel switching.

DETAILED DESCRIPTION OF THE INVENTION

Figure 1:
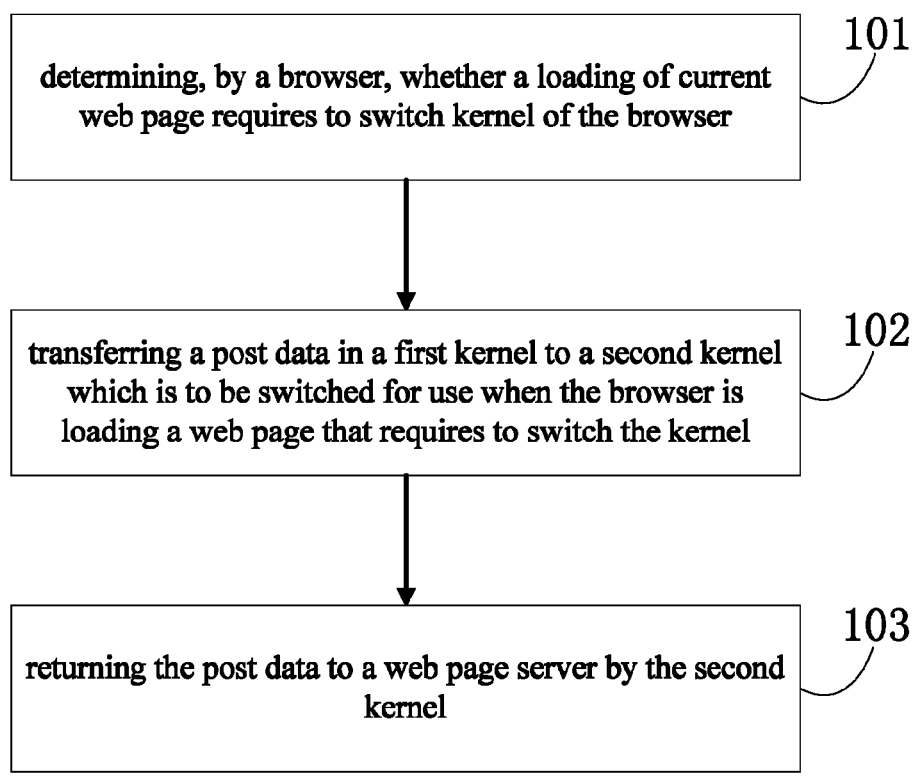
FIG. 1 is a flow chart of a browser kernel switching method in a specific embodiment of the present invention.

The most important part of a browser is a Rendering Engine, which is usually called a "browser kernel" and is responsible for parsing the web page syntax (e.g. HTML, JavaScript), rendering and displaying web pages. Thus the so-called browser kernel generally refers to the rendering engine used by a browser, and the rendering engine determines how a browser will display the contents of a web page and the format information of the page. Different browser kernels have different parses on a web page writing syntax, so the same web page may be rendered and displayed differently in browsers of different kernels.

Common browser kernels include:

(1) Trident™

Trident ™ (or MSHTML) is a kernel used by the web page browser, i.e. Internet Explorer, carried on Microsoft Windows, and this kernel program is used for the first time in IE 4 in 1997, afterwards, new technologies were constantly added thereinto and were released with new versions of IE. Trident™ is actually an open kernel, and the Trident™ engine is designed into a software component (module), so that other software developers can easily add the web page browsing function into applications they have developed. Because the interface kernel design thereof is very sophisticated, many non-IE browsers that use the IE kernel are developed, but Trident™ can only be used on the Windows platform.

Because of the "monopoly" of IE, the Trident™ kernel has been dominating for a very long time, and Microsoft does not upgrade the Trident™ kernel in quite a long time, resulting in two consequences: one is that the Trident™ kernel has almost divorced from the W3C standard, the other is that safety problems like a lot of bugs in the Trident™ kernel are not solved in time. Now, Microsoft company has made great changes to the Trident™ rendering engine by adding new technologies as well as supports to web page standards, nevertheless, these changes have fall far behind other rendering engines.

(2) Gecko

Gecko is a web page rendering engine written by C++ using open source codes, which is now used by browsers of the Mozilla family and by Netscape browsers higher than version 6. Gecko is characterized by the full disclosure of the codes, so it is highly developable and programmers all over the world can write codes for it to add functions.

The Gecko rendering engine provides a rich program interface for use by applications relating to the Internet, such as a web page browser, an HTML editor, a client/server, etc. In addition, Gecko is also a cross-platform kernel, which can be used in Windows, BSD, Linux and Mac OS X.

(3) Presto

Presto is a browser rendering engine developed by Opera Software. The characteristic of Presto is that the rendering speed has been optimized to the maximum, so it is the currently accepted browser kernel having the fastest web page browsing speed, but it sacrifices the web page compatibility as a cost.

Presto is actually a dynamic kernel, and the most significant difference between Presto and the Trident™, Gecko kernels etc. lies in script processing, in which aspect Presto has advantage by nature, and all or part of the page can be re-parsed under circumstances like responding to script events.

(4) WebKit®

WebKit® is a Web Browser Engine with open source codes. The original codes of WebKit® are from KHTML and KJS of KDE (which are all open source codes and free software, and are authorized under the GPL protocol). Therefore, WebKit® is also a free software and has open source codes at the same time.

At present, most dual-kernel technologies are basically in the form of Trident™ kernel+WebKit® kernel, in which no problem occurs if simply using the first kernel to access a first page and using the second kernel to access a second page. However, if the first page accessed by the first kernel requires to be redirected to the second page, a problem of loading failure will occur when loading the page by the second kernel. For example, the first kernel and the second kernel may refer to the above-mentioned Trident™ kernel and WebKit® kernel, when the first kernel refers to the Trident™ kernel, the second kernel refers to the WebKit® kernel; when the first kernel refers to the WebKit® kernel, the second kernel refers to the Trident™ kernel.

It is found after analyzing data between browser kernels, when a browser switches kernels, the failure is mostly caused by that the post form data are not transferred successfully. Wherein, said post form data is data transferred to the web page server by the client browser using HTTP information data fields. During communication between the browser and the web server, the browser can transfer data through post events, said data are not expected to be transferred in the form of plaintexts like data in the URL during communication, but they are added into data packets to be transferred to the web page server by means of post.

Generally, when a browser sends a request to a web page server, it will call a post event to generate post form data. Suppose that initially the browser uses a first kernel to send a request to the web page server to generate post form data, if the browser switches to the second kernel, then the second kernel will discard the post form data of the first kernel when transferring data to the web page server, thus causing an error.

It shall be noted that if the browser kernel calls other events instead of the post event to transfer data so as to achieve the same or similar effect as that achieved by the post event, then the generated form data are non-post form data, but the form data generated by calling other events will also cause web page loading failure because they are not transferred to the kernel to be switched for use. In this case, the method of processing is the same as the method described below and will not be repeated now.

The most common case is the switching from a shopping web site to a payment web site. Payment web sites are usually rather dependent on the Trident™ kernel because of the need for safety, stability and compatibility, and if other kernels are used, an error will occur during the redirection, and if the WebKit® kernel is used on the shopping web site and the Trident™ kernel is used on the payment web site, an error will also occur.

With respect to the problems that will be caused by dual-kernel switching in the prior art, the present invention provides a browser kernel switching method.

Referring to FIG. 1, the method provided by the present invention comprises the following steps:

Step 101: determining, by a browser, whether loading of the current page requires to switch kernel of the browser;

Step 102: transferring a post data in a first kernel of the browser to a second kernel of the browser which is to be switched for use when the browser is loading a web page that requires to switch the kernel of the browser;

Step 103: returning the post data to a web page server by the second kernel.

In a specific embodiment, a high speed WebKit® kernel is used by the browser by default, and when the browser redirects to a payment web site and loads the web page thereof, it switches to the Trident® kernel. The browser obtains the post data under the WebKit® kernel by the called API interface which is provided by the Webkit® kernel for the external program calls, and transfers the post data to the Trident™ kernel which then returns the received post data to the web page server.

In another specific embodiment, the method of determining, by a browser, whether the loading of the current web page requires to switch kernel of the browser employs a method of maintaining the kernel switching list.

Said kernel switching list records the situations of web page redirection in which the first kernel requires to be switched to the second kernel. These situations of page redirection can be represented by a record of redirecting from one web site to another, for example, the web site redirection information of redirecting from a shopping web site to a payment web site is recorded. Of course, the situations of page redirection may also be recorded in said kernel switching list in other forms, for example, recording only the redirected web site of the kernel to be switched to when a certain kernel is used by default. Some common situations of the page redirection of the kernel to be switched may be pre-set in said kernel switching list. However, said situations of page redirection are preferably generated by a statistics of the usage by the browser users. When user's redirecting a web page by the first kernel fails and redirecting the web page by the second kernel succeeds, the browser records this redirecting operation and uploads said redirecting operation to the browser management server. Said browser management server records this redirecting operation into the kernel switching list, and makes the browser to perform a kernel switching operation when the same redirecting operation is performed by any user again.

Said browser management server collects the situations of using of all browser users to generate said kernel switching list. Said browser searches said kernel switching list when performing the page redirecting, thereby learning whether it is necessary to switch the browser kernel.

To expedite the searching, the browser may periodically download the latest kernel switching list from the browser management server, or the browser management server pushes the latest kernel switching list to the browser, which stores said kernel switching list into a local buffer memory, and each time of searching can be performed by directly reading the local buffer memory. Of course, the browser may also send a searching request to the browser management server each time, and then the browser management server returns a result.

Moreover, there is another case in which the current page redirection is not recorded into the kernel switching list, and an error will occur when the browser uses the first kernel to load the web page, then the browser will provide a prompting message to prompt the user whether a kernel switching is to be performed, if the user chooses to switch, the kernel switching will be finished by proceeding with steps 102 and 103. With respect to such web page redirection situation that is not in the kernel switching list, the browser will record and upload it to the browser management server, which will in turn add said new page redirection situation into the kernel switching list. In practical application, it may also be uploaded after manual examination and verification.

The present invention uses the dual-kernel switching method to enable a faster browsing of shopping pages by taking advantage of the ability of fast page processing of the WebKit® kernel, and to finish the payment smoothly by sending the post data redirected to the payment page to the Trident® kernel, thus improving the user's feeling.

Although the present invention is described by taking the switching from the WebKit® kernel to the Trident™ kernel as an example, the idea of the present invention is not limited to said kernel switching process. All methods of transferring post data during kernel switching shall fall within the protection scope of the present invention.

Based on the above descriptions, an embodiment of the present invention also provides a browser kernel switching apparatus, which is used in a browser to enable the browser to use different browser kernels for different pages, said apparatus comprises:

a module 10 adapted to determining by the browser whether a loading of the current web page requires to switch kernel of the browser;

a module 20 adapted to transferring a post data in a first kernel of the browser to a second kernel of the browser which is to be switched for use when the browser is loading a webpage that requires to switch the kernel of the browser;

a module 30 adapted to returning the post data from the second kernel of the browser to a web page server.

Wherein, said module 20 can obtain the post data in the first kernel through an interface of the browser kernel.

Preferably, said apparatus further comprises:

a module adapted to exchanging data with a browser management server over the Internet;

the browser management server obtaining an operation that requires to switch kernel of the browser during the user's use of the browser and generating a kernel switching list;

said module 10 adapted to determining by the browser whether a loading of the current web page requires to switch the kernel searching the kernel switching list when performing the determination, and determining whether it is necessary to switch the kernel according to the result of searching.

Preferably, said apparatus may further comprise:

a module adapted to, when user's redirecting a web page by the first kernel fails and redirecting the web page by the second kernel succeeds, recording this redirecting operation and uploading said redirecting operation to the browser management server;

the browser management server recording this redirecting operation into the kernel switching list and making the browser to perform a kernel switching operation when the same redirecting operation is performed by any user again.

With respect to the above embodiment of the browser kernel switching apparatus, it is described in a general manner because it is substantially similar to the embodiment of the method. As for the relevant details, reference can be made to descriptions of the embodiment of the method shown in FIG. 1.

Figure 2:
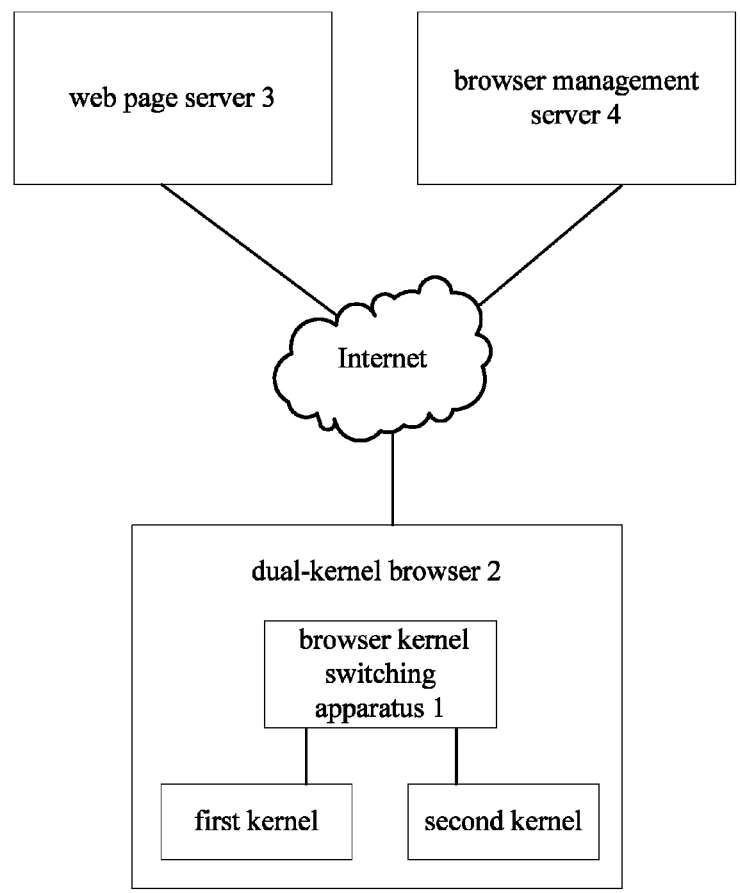
FIG. 2 is a schematic drawing of a specific embodiment in the application environment of the present invention.

The above-mentioned browser kernel switching apparatus can be applied to the following environments as shown in FIG. 2:

The browser kernel switching apparatus 1 can be made into a separate client software in such form as a plug-in and installed in a dual-kernel browser 2 which uses a first kernel and a second kernel. When the loaded web page requires a kernel switching, the dual-kernel browser 2 realizes the kernel switching through the browser kernel switching apparatus 1 transferring the post data, and returns the post data to a web page server 3 from the switched kernel.

Said browser kernel switching apparatus 1 may also exchange data with a browser management server 4 over the Internet, the browser management server 4 obtains an operation that requires to switch the kernel during user's use of the browser and generates a kernel switching list. Said browser kernel switching apparatus 1 searches the kernel switching list when determining whether a loading of the current web page requires to switch kernel of the browser, and determines whether it is necessary to switch the kernel according to the result of searching.

Further, the browser management server 4 can generate a kernel switching list according to a statistics of the usage of the browser users. When user's redirecting a page by the first kernel fails and redirecting the page by the second kernel succeeds, said dual-kernel browser 2 records this redirecting operation and uploading said redirecting operation to the browser management server 4. The browser management server 4 records this redirecting operation into the kernel switching list and makes the dual-kernel browser 2 to perform a kernel switching operation when the same redirecting operation is performed by any user again.

Based on the above descriptions, the present invention also provides a computer readable recording medium having program for executing said browser kernel switching method recorded thereon. Wherein, for details of said browser kernel switching method, reference can be made to the contents of the embodiment of FIG. 1 and no repetition is made herein.

Said computer readable recording medium comprises any mechanism for storing or transferring information in a computer readable form. For example, the computer readable medium comprises a read-only memory (ROM), a random access memory (RAM), disc storage medium, optical storage medium, flash memory medium, electrical, optical, acoustic or other forms of propagation signals (e.g. carrier, infrared signal, digital signal), and the like.

The present invention can be applied to various general-purpose or special-purpose computer system environments or configurations. For example, a personal computer, a server computer, a handheld device or portable device, a pad device, a multiprocessor system, a microprocessor-based system, a set top box, a programmable consumer electronic device, a network PC, a minicomputer, a mainframe computer, a distributed computing environment including any of the above systems or devices, etc.

The present invention can be described in a general context of a computer executable instruction executed by a computer, for example, a program module. Generally, the program module includes a routine, program, object, component, data structure, etc. for executing a specific task or realizing a specific abstract data type. The present application can also be practiced in distributed computing environments, in which tasks are executed by remote processing devices connected via communication networks. In distributed computing environments, program modules may be located in local and remote computer storage mediums including the storage device.

In the present invention, terms like "component", "apparatus" and "system" refer to the corresponding entities applied to a computer, such as hardware, combination of hardware and software, software or running software, etc. To be specific, for example, the component can be, but is not limited to, a process running on a processor, a processor, an object, an executable component, an execution thread, a program and/or computer. Moreover, an application or script running on a server or a server may be a component. One or more components can be in an executing process and/or thread, and the component can be localized on a computer and/or distributed between two or more computers, and can be run by various computer readable mediums. The component may also communicate through a local and/or remote process according to signals having one or more data packets, for example, signals from data interacting with another component in a local system or a distributed system and/or interacting with other systems through signals in an Internet.

The above described are only preferred embodiments of the present invention, which do not intend to limit the present invention. Any modification and equivalent substitution made within the spirit and principle of the present invention shall be included in the protection scope of the present invention.

The invention claimed is:

1. A browser kernel switching method which enables a browser to use different browser kernels for different web pages, comprising:
    determining, by a browser, whether a loading of current web page requires to switch kernel of the browser;
    transferring a post data in a first kernel of the browser to a second kernel of the browser which is to be switched for use in the browser, when the browser is loading a web page that requires to switch the kernel of the browser;
    returning the post data, by the second kernel of the browser, to a web page server
    wherein the browser exchanges data with a browser management server over the Internet, and said method further comprises:
        obtaining, by said browser management server, operations that require kernel switch during the user's use of the browser and generating a kernel switching list;
        searching said kernel switching list when the browser performs the step of determining whether the loading of current web page requires to switch kernel of the browser; and
        determining whether it is necessary to switch the kernel according to a result of the searching; and
    wherein a method of generating said kernel switching list comprises: when user's redirecting to a web page by the first kernel fails and redirecting to the web page by the second kernel succeeds, recording this redirecting operation by the browser and uploading said redirecting operation to the browser management server; recording this redirecting operation into the kernel switching list by the browser management server and making the browser to perform a kernel switching operation when the same redirecting operation is performed by any user again.

2. The method of claim 1, wherein the step of transferring the post data further comprises:
    obtaining the post data in the first kernel by the browser through an interface of the browser kernel.

3. The method of claim 1, wherein when the browser redirects to a payment web site and loads the web page thereof, the kernel of the browser requires to be switched.

4. The method of claim 3, wherein when the first kernel of the browser is WebKit® kernel, and the second kernel of the browser is Trident™ kernel, and the process of transferring a post data in the first kernel of the browser to the second kernel of the browser comprise:
    obtaining the post data under the WebKit® kernel by the called API interface which is provided by the Webkit® kernel for the external program calls; and
    transferring the post data to the Trident™ kernel which returns the received post data to the web page server.

5. The method of claim 1, the process of searching the kernel switching list further comprise:
periodically downloading by the browser the latest kernel switching list from the browser management server, or pushing by the browser management server the latest kernel switching list to the browser; storing the kernel switching list into a local buffer memory, and wherein each time of searching is performed by reading the local buffer memory; or
send by the browser a searching request to the browser management server each time, and returns a search result by the browser management server.

6. A browser kernel switching apparatus, which apparatus enables a browser to use different browser kernels for different web pages, and comprising a plurality of modules and at least one processor to execute the plurality of modules, the plurality of modules comprising:
a first module to determine by the browser whether a loading of the current web page requires to switch kernel of the browser;
a second module to transfer a post data in a first kernel of the browser to a second kernel of the browser which is to be switched for use in the browser, when the browser is loading a page that requires to switch the kernel of the browser;
a third module to return the post data to a web page server by the second kernel of the browser;
a fourth module to exchange data over the Internet with a browser management server which obtains operations that require kernel switch during the user's use of the browser and generates a kernel switching list; said first module which determines by the browser whether a loading of the current web page requires to switch kernel of the browser searches the kernel switching list when performing the determination, and determines whether it is necessary to switch the kernel according to a result of the searching;
a fifth module to, when user's redirecting to a web page by the first kernel fails and redirecting to the web page by the second kernel succeeds, record this redirecting operation and upload said redirecting operation to the browser management server, wherein the browser management server records this redirecting operation into the kernel switching list and makes the browser to perform a kernel switching operation when the same redirecting operation is performed by any user again.

7. A non-transitory computer readable recording medium having instructions stored thereon that, when executed by at least one processor, cause the at least one processor to perform operations for enabling a browser to use different browser kernels for different web pages, comprising:
determining, by a browser, whether a loading of current web page requires to switch kernel of the browser;
transferring a post data in a first kernel of the browser to a second kernel of the browser which is to be switched for use in the browser, when the browser is loading a web page that requires to switch the kernel of the browser; and
returning the post data, by the second kernel of the browser, to a web page server;
wherein the browser exchanges data with a browser management server over the Internet, and said operations for enabling a browser to use different browser kernels for different web pages further comprises: obtaining, by said browser management server, operations that require kernel switch during the user's use of the browser and generating a kernel switching list; searching said kernel switching list when the browser performs the step of determining whether the loading of current web page requires to switch kernel of the browser; and determining whether it is necessary to switch the kernel according to a result of the searching; and
wherein said generating a kernel switching list comprises: when user's redirecting to a web page by the first kernel fails and redirecting to the web page by the second kernel succeeds, recording this redirecting operation by the browser and uploading said redirecting operation to the browser management server; recording this redirecting operation into the kernel switching list by the browser management server and making the browser to perform a kernel switching operation when the same redirecting operation is performed by any user again.

* * * * *